(No Model.)
P. LONG, DE W. C. VESTAL & A. F. MERIGOT.
SPRAY NOZZLE.
No. 251,448.  Patented Dec. 27, 1881.
Fig. 1.  Fig. 2.  Fig. 3.
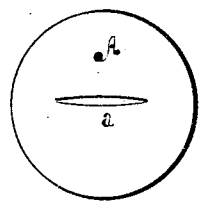 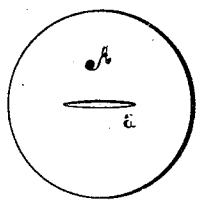 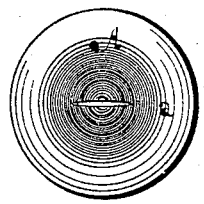
Fig. 4.
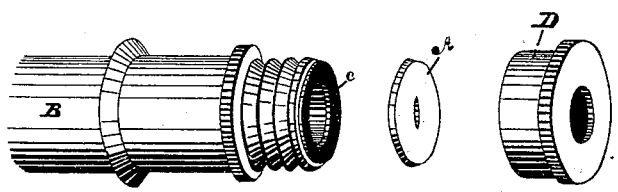
Fig. 5.
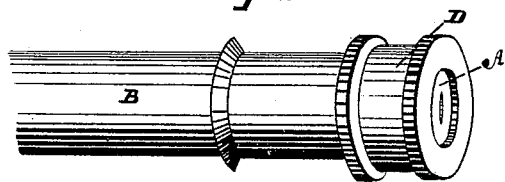
Witnesses
Geo. H. Strong.
Frank A. Brooks
Inventors
Peter Long,
De Witt C. Vestal,
Albert F. Merigot
By Dewey & Co.
Attys

United States Patent Office.

PETER LONG, DE WITT C. VESTAL, AND ALBERT F. MERIGOT, OF SAN JOSÉ, CALIFORNIA; SAID VESTAL AND LONG ASSIGNORS TO SAID MERIGOT AND WESLEY FANNING, OF SAME PLACE.

SPRAY-NOZZLE.

SPECIFICATION forming part of Letters Patent No. 251,448, dated December 27, 1881.

Application filed September 27, 1881. (No model.)

*To all whom it may concern:*

Be it known that we, PETER LONG, DE WITT C. VESTAL, and ALBERT F. MERIGOT, all of San José, county of Santa Clara, and State of California, have invented an Improved Spray-Nozzle; and we hereby declare the following to be a full, clear, and exact description thereof.

Our invention relates to a spray-nozzle for a hose or pipe, the object of which is to eject water or other liquid in a fine spray, so that it may lightly and gently cover the objects against which it is directed.

Our invention consists in providing a hose-nozzle with an elongated oval slit or aperture, contracted at its ends and widening at its mid-length, for the passage of the water, whereby it is sprayed.

Our invention also consists in sundry details of construction, as hereinafter fully described and specifically claimed. This will hereinafter fully appear, reference being made to the accompanying drawings, in which—

Figures 1 and 2 show rear and front of plate with slot. Fig. 3 shows convex plate. Fig. 4 shows the parts of the spray-nozzle separate. Fig. 5 shows the device complete.

A represents a plate or disk in which is a slit or aperture, *a*. This slit is made oval in shape—that is, pointed and narrow at the ends and widening to the middle. It is made by a lance or punch from one side, so that it has greater dimensions upon one side than the other, and, calling the side from which it is cut the "inside," the slit narrows or contracts toward the outside. This plate or disk A we have shown flat, though it may be made convex, as shown in Fig. 3, or assume any suitable shape, the essential part of the invention being the slit *a*, of shape as shown.

B represents a short section of pipe, open at both ends, provided with screw-threads on the inner side of its rear end, so as to adapt it to be secured to the end of a hose or pipe. It has screw-threads on the forward end. A suitable washer, *c*, is put upon the forward end. Upon this washer the plate A is laid, with that side inwardly from which the slit *a* is made, so that, as before explained, the slit may contract toward the outside. A screw-cap, D, with a central aperture, as shown, is screwed upon the end of the pipe B, thus securing the disk or plate A, while allowing the slit *a* to be in open relation with the outside.

Water from the hose forced through the slit *a* will be ejected in a fine spray. It passes through it in a thin sheet, and, diverging in extended ends, spreads itself out over so great a space that it is divided in minute particles more effectively than if forced through small holes. This device is useful for the application of insect-destroyers, &c., to valuable vines or trees.

Although we have herein described a device for properly holding the plate or disk A, we do not confine ourselves to this alone. Other devices may be constructed which will contain or secure the plate.

An advantage of this device is that the plate A may be readily removed when for any cause—such as wear or the obstruction of a grain of sand—it becomes necessary, and another inserted. Different sizes may be used when desired.

Having thus described our invention, what we claim as new, and desire to secure by Letters Patent, is—

1. A nozzle for water-pipes, &c., having an elongated oval slit or aperture which is contracted at its ends and widening at its mid-length, substantially as described.

2. In a spray-nozzle adapted to be secured to a hose, pipe, or other liquid-containing vessel or tube, the plate, cap, or disk A, having a slit or aperture, *a*, said slit or aperture having an elongated oval shape that is contracted or narrow at its ends and widening to the middle, substantially as herein described.

3. The spray-nozzle consisting of the pipe B, adapted to be secured to a pipe, hose, or other similar water containing vessel, the plate, cap, or disk A, having an elongated oval slit or aperture, *a*, and the cap D, with its aperture, arranged substantially as described.

In witness whereof we have hereunto set our hands.

PETER LONG.
DE WITT C. VESTAL.
ALBERT F. MERIGOT.

Witnesses:
J. E. BROWN,
JOHN BERN.